United States Patent
Kasprzyk

(10) Patent No.: US 8,805,196 B2
(45) Date of Patent: Aug. 12, 2014

(54) ELECTRO-OPTICAL COMMUNICATIONS LINK

(75) Inventor: Marlon Zbigniew Kasprzyk, Winfield, IL (US)

(73) Assignee: Teradyne, Inc., North Reading, MA (US)

( * ) Notice: Subject to any disclaimer, the term of this patent is extended or adjusted under 35 U.S.C. 154(b) by 493 days.

(21) Appl. No.: 12/894,804

(22) Filed: Sep. 30, 2010

(65) Prior Publication Data

US 2012/0082463 A1     Apr. 5, 2012

(51) Int. Cl.
*H04B 10/00* (2013.01)
*H04B 10/12* (2006.01)
*H04B 10/04* (2006.01)
*H04B 10/06* (2006.01)

(52) U.S. Cl.
USPC ........... 398/140; 398/151; 398/182; 398/192; 398/195; 398/197; 398/202

(58) Field of Classification Search
CPC ........ H04B 10/50; H04B 10/60; H04B 10/80; H04B 17/00; H04B 17/0002; H04B 17/004; H04B 2210/08
See application file for complete search history.

(56) References Cited

U.S. PATENT DOCUMENTS

| | | | | |
|---|---|---|---|---|
| 4,599,745 | A | * | 7/1986 | Baran et al. .................. 398/104 |
| 5,224,128 | A | * | 6/1993 | Grallert ........................ 375/351 |
| 6,023,357 | A | | 2/2000 | Miyasita |
| 7,296,936 | B2 | | 11/2007 | Crews |
| 2006/0129733 | A1 | | 6/2006 | Sobelman |
| 2008/0212964 | A1 | | 9/2008 | Gao et al. |
| 2009/0006708 | A1 | * | 1/2009 | Lim ............................. 710/314 |
| 2009/0279889 | A1 | * | 11/2009 | Kirkpatrick et al. ........... 398/41 |

FOREIGN PATENT DOCUMENTS

JP   2003-158490 A   5/2003
KR   10-2009-0041163 A   4/2009

* cited by examiner

*Primary Examiner* — Darren E Wolf
(74) *Attorney, Agent, or Firm* — BainwoodHuang

(57) ABSTRACT

A communications link for carrying data between a transmitter and a receiver operates according to a communications protocol (such as PCI Express (PCIe)) specifying a reduced-power link operating state in which the transmitter generates a reduced-amplitude electrical output signal and the receiver is to operate in a power-save mode. The communications link includes an electro-optical link and a circuit coupling an output of the transmitter to an electrical input of the electro-optical link. The circuit is configured to detect initiation of the reduced-power operating state and to send messages to the receiver to maintain a normal amplitude of an optical signal on the electro-optical link.

18 Claims, 3 Drawing Sheets

ELECTRO-OPTICAL COMMUNICATIONS LINK

BACKGROUND

The present invention is related to the field of computer interconnections.

There is increasing use of computer interconnections according to the Peripheral Component Interconnect-Express (PCIe) standard, which has gained popularity in both desktop computing and in embedded systems due to its high data throughput and openness (i.e., use of non-proprietary technology). One of the features of the PCIe standard is its support for connecting a host controller (e.g., a personal computer or PC) to devices (or targets) some distance away. However, the electrical specification imposes a limit of about 15 meters on interconnect length, and does not provide for electrical isolation between the host controller and the target device, which may be desirable in some applications.

It is generally known to employ optical communications links in certain applications. An optical link inherently provides electrical isolation, and in most cases also permits much longer separation between two devices or nodes communicating over the link. Also, because they do not radiate electromagnetic interference (EMI), their use can be beneficial in EMI compliance testing for example. Optical links commonly employ optical transceiver components that provide conversion between electrical and optical signaling. Known components include those employed in Fibre Channel and SONET communications systems for example.

SUMMARY

The serial high-speed nature of PCIe links suggests potential desirability of employing optical transceivers and links to carry PCIe traffic, thereby achieving the benefits of PCIe (openness and ubiquity) with the additional benefits (increased length/separation along with electrical isolation) of optical communications. Nonetheless, standard optical transceiver components used in optical communications systems are not designed specifically for use in PCIe links and therefore may not correctly support all PCIe operations. In particular and as described herein, standard optical transceiver components may exhibit certain delays in automatic gain-adjustment operation that in some cases can interfere with accurate reproduction of important PCIe messages that control power states of the PCIe link. Such deleterious interplay between the optical transceiver components and PCIe components is to be avoided for a viable electro-optical PCIe link to be realized.

In accordance with embodiments of the present invention, a communications link is disclosed for carrying data between a transmitter and a receiver according to a communications protocol (such as PCIe) which specifies a reduced-power link operating state. In the reduced-power link operating state, the transmitter generates a reduced-amplitude electrical output signal representing absence of meaningful data from the signal lines, and the receiver is specified to operate in a power-save mode. The reduced-power link operating state may be accompanied by use of an entry message and an exit message to be sent from the transmitter to the receiver to cause the receiver to enter and exit the power-save mode respectively.

The communications link includes an electro-optical link having a potential for inaccurate reproduction of a control message (such as an exit message) which is to bring the receiver out of the power-save mode. In such a case, the link could be rendered inoperable. This potential problem arises from the use of automatic gain-adjustment circuitry within an optical receiver. When the transmitter increases the amplitude of its output signal upon exiting the reduced-power link operating state, the gain-adjustment circuitry could temporarily apply excessive gain and cause the output of the optical receiver to become saturated. In this condition the optical receiver cannot faithfully reproduce a received message. If the control message is sent by the transmitter at this point, the receiver may never receive the control message and thus would not resume normal operation. The communications link could be rendered inoperable until some higher-level control action (such as a hard reset of the receiver, generally undesirable) is taken.

To avoid the above scenario, the communications link includes a circuit (such as an FPGA, ASIC, etc.) which couples an output of the transmitter to an electrical input of the electro-optical link. The circuit is configured to detect initiation of the reduced-power operating state and to send messages to the receiver to maintain a normal amplitude of an optical signal on the electro-optical link, thereby causing the automatic gain-adjustment circuitry to maintain a normal level of gain. The optical receiver maintains its ability to faithfully reproduce control messages, and the conditions under which the communications link could be rendered inoperable are avoided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
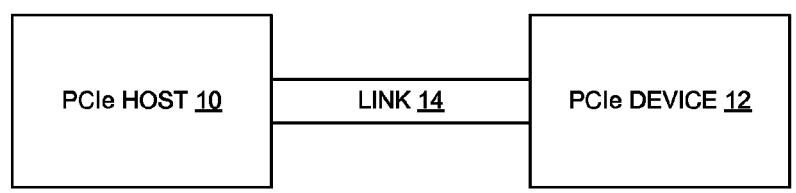
FIG. 1 is a block diagram of a computer system.

FIG. 1 shows a system including a PCIe host computer (PCIe HOST) 10 coupled to a PCIe peripheral device (PCIe DEVICE) 12 via a communications link (LINK) 14. The communications link 14 includes both PCIe electrical elements as well as optical components collectively constituting an "electro-optical link" and discussed in more detail below.

A general description of certain operational aspects of PCIe (per applicable standards or specifications) is now provided in order to provide important context information for further description of embodiments of the invention, which resumes below with reference to FIG. 2.

As a next generation of non-proprietary Personal Computer (PC) peripheral component interconnect, PCIe has a rather extensive set of power down (or sleep) modes that are part of an Advanced Configuration and Power Interface (ACPI) specification. ACPI is an open standard for unified operating system-centric device configuration and power management which offers sophisticated power saving schemes.

According the ACPI specification, power saving states are usually defined as five different states at different subsystems of a computer system. For example, in the Intel based computer architecture, processors operate in various power states which are referred to as "C" states. The C States can range from C0 (full power on) to C1, C2, C3 or C4 (lowest power state). Peripheral devices (such as disk drives for example) operate in different "D" states ranging from D0 (full power on) to D1, D2, D3 or D4 (lowest power state).

ACPI also has influence over PCIe links used as the connecting artery between the processor and the peripherals. PCIe power states are defined as "L" (link) power states. Unlike the other computer subsystem states, the PCIe has an additional state defined as L0s state, which is a transitory lower-power state used during gaps in link activity. Thus the PCIe states can range from L0 (full power on) to L0s, L1, L2, L3 or L4 (lowest power state). Typically, system software (such as an operating system) will instruct an ACPI controller to place a device in a low power mode upon detecting that the peripheral (PC card, attached disk drive, display monitor, etc) has not been used for a period of time. However, on a PCIe link a transition into and out of the L0s state occurs by operation of link hardware circuitry without intervention of system software.

According to the PCIe standard, PCIe physical layer circuitry transitions the link to the L0s state whenever the link becomes idle. This power-saving state is managed on a per-direction basis. Thus, the transmit side of a link from a device (such as a host controller) could be in the L0s state while the receive side to the device could remain in the full-power L0 state. It is expected that a PCIe link transitions into and out of the L0s state often, and therefore it is specified that the latencies associated with entering and exiting this state are relatively small (a maximum of several microseconds).

Figure 2:
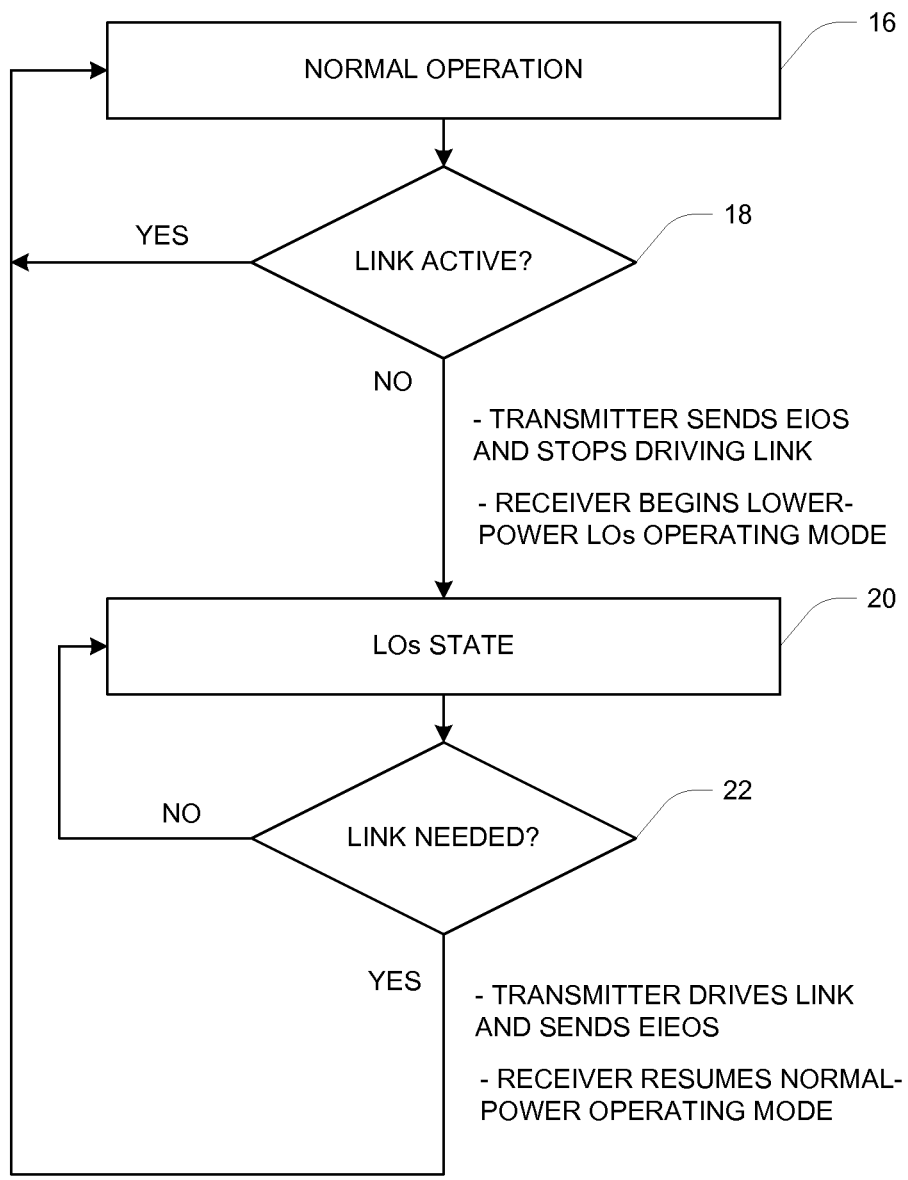
FIG. 2 is a flow diagram of certain operation of a PCIe link as known in the art.

FIG. 2 generally illustrates the transition into and out of the L0s state for a PCIe link. Normal operation (e.g., link state L0) occurs at 16. At 18 the transmitter determines whether the PCIe link is active (i.e., being used to send messages). If so, normal operation continues at 16. If not, then the L0s state is entered at 20. In order to place a device in the L0s power management state, the PCIe host controller sends a special set of PCIe symbols called the "electrical idle sequence ordered set" or EIOS. The symbols are defined by the 8b/10b encoding protocol used in PCIe. In an early generation or "Gen1" of PCIe, the EIOS consists of a COM symbol. (encoding K36.5) followed by three IDL symbols (encoding K36.3), i.e., COM IDL IDL IDL. In a later generation ("Gen2"), the L0s power management state is enabled by the sending of two successive electrical idle sequence ordered sets (i.e., COM IDL IDL IDL COM IDL IDL IDL). The EIOS is an example of an "entry message" by which a transmitter informs a link partner receiver that a reduced-power link operating state is being entered.

According to the PCIe standard, after sending the EIOS the transmitter has to transition to a valid "electrical idle" within 28 "unit intervals" or UI. A unit interval is defined as a single bit time or inverse of signaling frequency. So for PCIe Gen1 (2.5 gigahertz) the transition time equates to approximately to 8 ns, and for the PCIe Gen2 (5 gigahertz) to approximately 4 ns. As soon as the transmitter enters the L0s state, the traffic on the differential lane(s) which constitute the link stops, and the two individual signal lines of each lane are brought to a DC balanced state within 28 mV of each other, which represents a very low-amplitude differential signal. Upon entering the L0s state, a transmitter must remain in the L0s state for a minimum of 50 UI (28 ns for PCIe Gen1, 10 ns for Gen). It will be appreciated that in this state the differential signal lines do not represent a legal binary signal (neither a logic 0 nor a logic 1).

In the L0s state 20, the transmitter continually determines whether it needs to use the PCIe link to send new messages as indicated at 22. If not, operation in the L0s state continues at 20. Otherwise, the L0s state is exited and normal operation at 16 is resumed. To exit the L0s state, the transmitter resumes driving the differential signal lines at normal-amplitude differential voltage levels, and then sends an "electrical idle exit ordered set" or EIEOS which includes a so-called fast training sequence or FTS. In PCIe Gen1, the EIEOS consists of a COM character (K36.5) and three Fast Training Set (FTS) special symbols (K36.1), i.e., COM, FTS, FTS, FTS. For PCIe Gen2, the EIEOS consists of 24 symbols as follows: COM (K36.5), 13×EIE-K (K36.7) symbols with low frequency components for helping achieve exit from Electrical Idle and one TS1 Identifier (D10.2). The EIEOS is an example of an "exit message" by which a transmitter informs a link partner receiver that the reduced-power link operating state is being exited.

As previously mentioned, the standard physical-layer implementation of PCIe imposes a limit on separation between host 10 and device 12, and it also does not provide for electrical isolation. For that reason, the link 14 of FIG. 1 employs an optical link along with suitable optical transceiver components, as described in more detail below. One problem that arises in this configuration is that standard optical transceiver devices, such as those used in Fibre Channel or SONET systems, are not designed to include or to be compatible with lower-power link states such as L0s defined for PCIe. In particular, the components operate on the assumption that link traffic is essentially always present and thus there is no concept of an "electrical idle" in which the link signals assume substantially equal values as described above. If not properly addressed, this incompatibility could result in a particular scenario of improper operations as now described. The description below refers to an optical transceiver using the term "ROSA" for Receiver Optical Subassembly, which is a transceiver functioning to convert optical signals from the optical link to electrical signals. The ROSA includes variable-amplification (or variable-gain) circuitry by which it automatically compensates for variation in the amplitude of the input optical signal to generate a certain predetermined amplitude of an output electrical signal, as generally known in the art.

1. As a part of normal PCIe operation the transmitter sends EIOS and enters the L0s state. PCIe link traffic stops and each lane pair goes into a DC balanced mode close to 0 Volts. This causes a large reduction in the amplitude of the optical signal on the optical link.
2. The ROSA on the receiving end, which has no knowledge of the EIOS or the electrical idle state, responds to the diminished-amplitude optical signal by increasing the amplification or "gain" it applies to the signal. Because the optical signal amplitude is reduced to essentially zero, the gain is increased to some maximum value that the variable-gain circuitry of the ROSA can achieve. In this state the electrical output of the ROSA is highly sensitive to a sudden large increase in amplitude of the optical input signal.
3. When the PCIe transmitter resumes use of the link, it resumes driving the lane(s) of the link at non-zero differential levels and sends the EIEOS as described above. Because the ROSA is operating at maximum gain, even the normal optical amplitude on the link momentarily saturates the ROSA input until the gain-control circuitry can respond to reduce the gain to an appropriate level. During the slight delay required for this gain adjustment, the output from the ROSA stays at a maximum electrical level rather than following the optical signal variations corresponding to the EIEOS symbols. Thus, the EIEOS is not accurately reproduced nor conveyed from the ROSA to the receiver circuitry (electrical) that is responsible for detecting and responding to the EIEOS and other PCIe signaling. Because the EIEOS is not recognized, the receiver does not recover from the L0s state and is not responsive to the subsequent link retrain process. The link is effectively non-operative.

One approach to avoiding the above scenario is to prevent the optical link from responding to the electrical idle with a diminished optical signal amplitude. If the optical signal amplitude is maintained sufficiently high, then the variable-gain circuitry of the ROSA does not attain the maximum-gain operating state nor require the adjustment delay that results in the receiver missing the EIEOS. Instead, the gain remains at a normal operating level, and the signals representing the EIEOS are accurately converted into corresponding electrical signals by the ROSA part enabling the receiver to properly detect and respond to the EIEOS.

Figure 3:
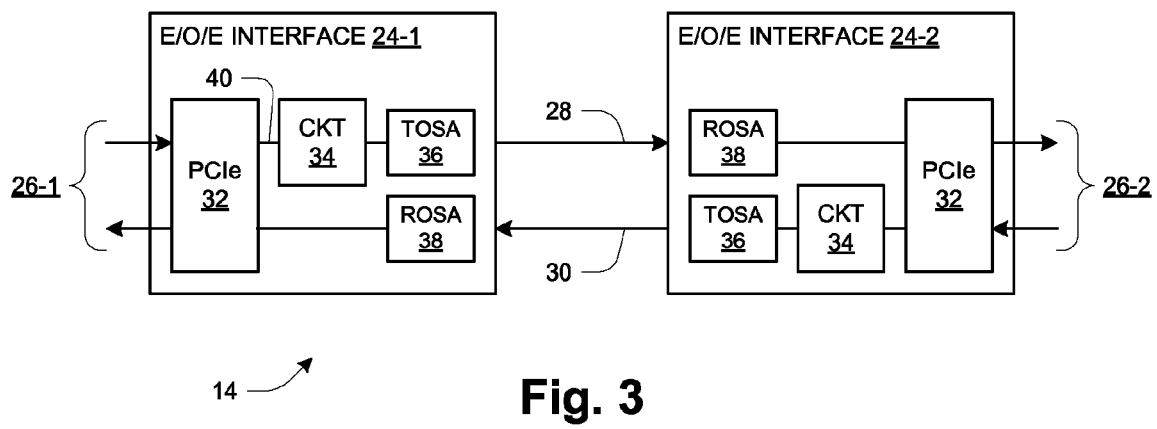
FIG. 3 is a block diagram of an electro-optical communications link.

FIG. 3 shows circuitry constituting the link 14 of FIG. 1. The circuitry includes a pair of electrical/optical (E/O/E) interfaces circuits (interfaces) 24. A first E/O/E interface 24-1 forms part of or is located immediately adjacent to the host 10 and has an electrical interface 26-1 thereto, while a second E/O/E interface 24-2 forms part of or is located immediately adjacent to the PCIe device 12 and has an electrical interface 26-2 thereto. The E/O/E interfaces 24 are interconnected by a pair of optical links 28, 30 for transmitting data in respective directions as indicated by the arrowheads. Each E/O/E interface 24 includes a PCIe circuit 32, a circuit 34 used for modifying behavior during electrical idle as described below, and TOSA and ROSA components 36, 38 (where TOSA stands for Transmit Optical Subassembly). Elsewhere in this description, the term "electro-optical link" is used to describe the combination of a TOSA 36 and partner ROSA 38 connected by an optical transmission link (e.g. 28). Thus in this respect the PCIe circuit 32 constitutes a transmitter providing an electrical input signal to the electro-optical link.

The PCIe circuit 32 provides PCIe interconnection and multi-layer functionality as generally known in the art. For example, in the host-side E/O/E interface 24-1 the PCIe circuit 32 may constitute a PCIe switch, while in the device-side E/O/E interface 24-2 the PCIe circuit 32 may constitute a PCIe endpoint. The circuit 34, which may be implemented using digital logic such as a field-programmable gate array (FPGA), application-specific integrated circuit (ASIC) etc., is capable of detecting certain PCIe messages and taking particular responsive actions, as is described immediately below. For specificity, the following description refers to the transmit side of E/O/E interface 24-1, optical link 28 and the receive side of E/O/E interface 24-2, but it will be appreciated that this description may be equally applicable to operation in the other direction.

As a part of normal PCIe operation as described above, the PCIe circuit 32 of the E/O/E interface 24-1 sends an EIOS and enters the L0s state. Its output PCIe link activity stops, and the electrical output signals on its transmit link pair 40 assume the DC balanced mode close to 0V as described above. During operation, the circuit 34 monitors the flow of PCIe signaling and detects the transmission of the EIOS. In response, the circuit 34 begins generating a PCIe "Logical Idle Sequence" and transmitting it on the optical link 28. The PCIe Logical Idle Sequence is characterized by the repeated transmission of an Idle symbol (00 h). The purpose of sending the Logical Idle Sequence is to maintain normal optical levels on the optical link 28 during the L0s period. The ROSA 38 on the E/O/E interface 24-2 continues to receive normal-level optical signals and thus maintains a normal level of gain, avoiding the sensitive maximum-gain operating state described above.

When the PCIe circuit 32 is to exit the electrical idle state, it resumes driving its differential output signals 40 at normal levels and sends the EIEOS. The circuit 34 recognizes the EIEOS message, stops generating the PCIe Logical Idle Sequence and resumes forwarding the PCIe traffic from the PCIe circuit 32 to the TOSA 36 in the normal fashion. The amplitude of the optical signal on the optical link 28 remains substantially the same, and therefore the ROSA 38 of the E/O/E interface 24-2 simply continues to apply normal gain and to accurately pass the PCIe messages along to the PCIe 32 of the E/O/E interface 24-2.

Figure 4:
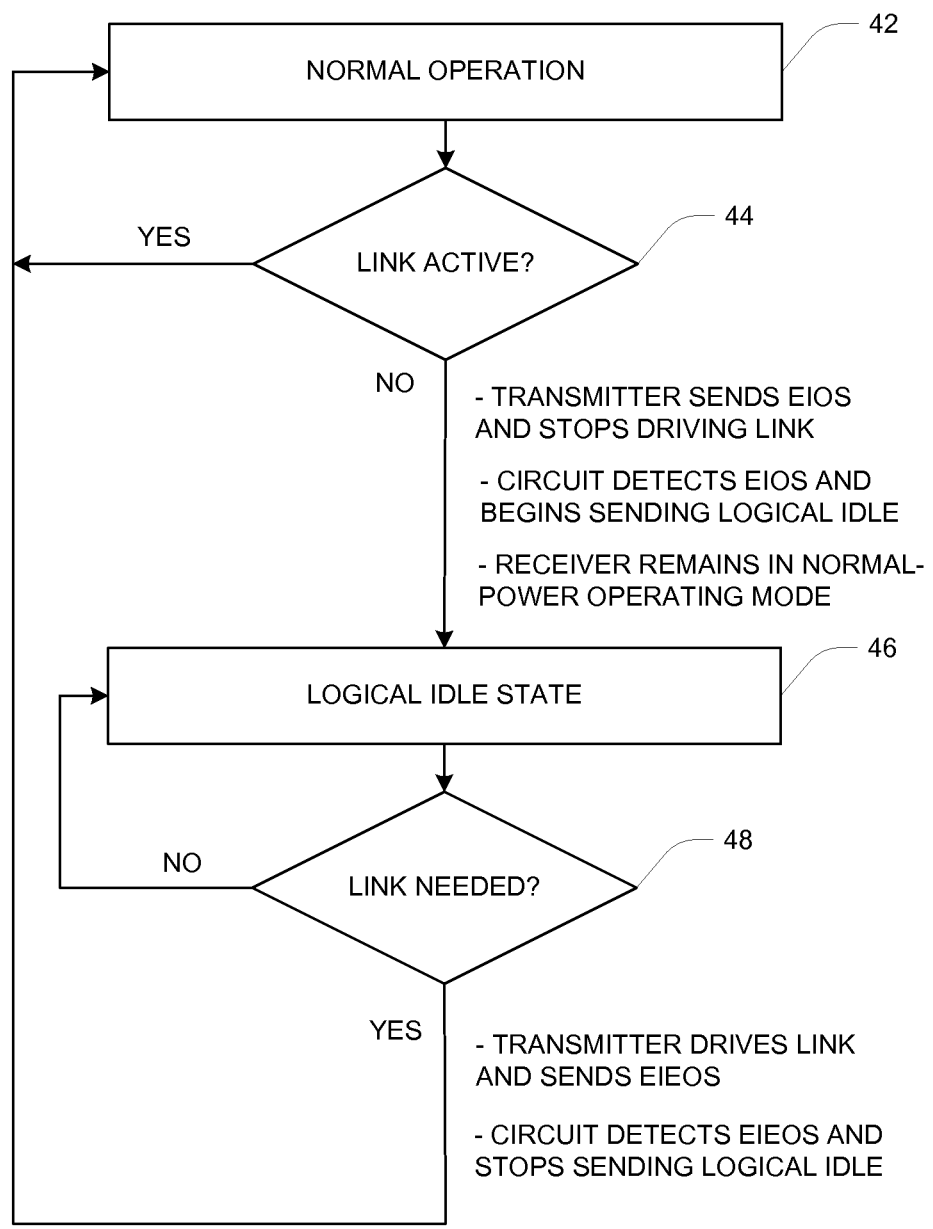
FIG. 4 is a flow diagram of certain operation of the electro-optical communications link.

FIG. 4 illustrates the above-described operation of the circuitry of FIG. 3. The overall operation may be seen as analogous to that of an intelligent switch having two operating positions, a normal position in which PCIe messages are simply passed directly from input to output and an "idle" position in which the input from the PCIe circuit 40 is ignored and the circuit 34 generates its own messages (Idle) and sends them to the TOSA 36.

Referring to FIG. 4, in a normal operating state at 42, PCIe traffic generated by the PCIe circuit 32 enters the circuit 34 which is designed/configured to detect PCIe EIOS and EIEOS messages. If none are detected, the circuit 34 allows the PCIe traffic to pass through.

At 44, the PCIe circuit 32 determines whether the transmit link 28 is active, and if so then both the PCIe circuit 32 and the E/O/E interface remain in the normal operating state 42. If the link 28 has become inactive, then the following occur as the system transfers to a logical idle operating state 46:

The PCIe circuit 32 sends the EIOS and stops driving its output 40

The circuit 34 detects the EIOS and begins sending Idle symbols. The circuit 34 does not forward the EIOS and thus the receiver (PCIe device 12) does not enter L0s)

The presence of traffic in the form of Idle symbols on the optical link 28 maintains normal-gain operation of the ROSA 38

At 46, operation continues as above, i.e., the circuit 34 sends Idle symbols. The circuit 34 also monitors the inputs 40 from the PCIe circuit 32. At 48, the PCIe circuit 32 determines whether it needs to use the transmit link (i.e., it has a new message to send on behalf of the PCIe host 10). If not, the Idle operation continues at 46. If so, then the following occurs as the system transitions back to the normal operating state 42 to enable the transmitter to send the new message:

The PCIe circuit 32 drives its output 40 at normal differential levels and sends the EIEOS message The circuit 34 detects the EIEOS, stops sending Idle symbols on the link 28 and instead resumes passing the PCIe traffic through from the inputs 40 to the TOSA 36

As already described, because of the use of Idle symbols on the optical link 28 during the logical idle state 46, the ROSA 38 simply maintains a normal gain level and thus experiences no saturation when normal operation resumes. The PCIe device 12 is prevented from entering the L0s state because it never receives the EIOS message, which is intercepted and acted upon by the circuit 34. Thus, the above-described scenario by which the communications link between the host 10 and device 12 becomes non-operative is avoided.

While various embodiments of the invention have been particularly shown and described, those skilled in the art will understand that various changes in form and details may be made without departing from the spirit and scope of the invention as defined by the appended claims.

What is claimed is:

1. A communications link for carrying data between a transmitter and a receiver according to a communications protocol specifying a reduced-power link operating state in which the transmitter generates a reduced-amplitude electrical output signal at an electrical output and the receiver is to operate in a power-save mode, the communications link comprising:
    an electro-optical link having an E/O converter for generating an optical signal from an electrical input signal at an electrical input, an optical transmission medium for carrying the optical signal, and an O/E converter for generating an electrical output signal from the optical signal, the electrical output signal provided to the receiver; and
    a circuit coupling the electrical output of the transmitter to the electrical input of the electro-optical link, the circuit being configured to (1) forward the electrical output signal of the transmitter to the electrical input of the electro-optical link during normal-power link operation, and (2) detect initiation of the reduced-power link operating state and, during the reduced-power link operating state, to periodically send Idle messages to the receiver via the electro-optical link to maintain a normal amplitude of the optical signal on the electro-optical link causing the receiver to maintain normal-power operation during the reduced-power link operating state.

2. A communications link according to claim 1, wherein the reduced-power link operating state is accompanied by an entry message and an exit message to be sent from the transmitter to the receiver to cause the receiver to enter and exit a power-save mode respectively, and wherein the circuit detects the entry message from the transmitter, the circuit refraining from sending the entry message to the receiver to prevent the receiver from entering the power-save mode.

3. A communications link according to claim 2, wherein the circuit sends a substantially normal amplitude signal to the receiver after detecting the entry message.

4. A communications link according to claim 3, wherein the substantially normal amplitude signal is a logical idle message.

5. A communications link according to claim 2, wherein the circuit monitors for the exit message from the transmitter and in response to detection of the exit message re-enters a normal operating state in which the circuit passes the output of the transmitter to the input of the electro-optical link and monitors for the entry message from the transmitter.

6. A communications link according to claim 1, wherein the electro-optical link includes a transmit optical subassembly housing the E/O converter, and a receiver optical subassembly housing the O/E converter, the transmit optical subassembly being operative to generate the optical signal on the optical transmission medium having a level corresponding to a level of the electrical input signal, and the receiver optical subassembly including a variable-gain circuit having a gain-adjustment delay capable of causing transitory saturation resulting in the inaccurate reproduction of a transmitted message, the gain-adjustment delay being prevented by the maintaining of the normal amplitude of the optical signal on the electro-optical link during the reduced-power link operating state.

7. A communications link according to claim 1, wherein the electrical output from the transmitter is a differential output having two signal lines driven to different voltage levels for a normal-amplitude electrical output signal and being driven to substantially equal voltage levels for the reduced-amplitude electrical output signal.

8. A computer system, comprising:
    a host controller;
    a peripheral device; and
    a communications link connecting the host controller as a transmitter to the peripheral device as a receiver, the communications link operating according to a communications protocol specifying a reduced-power link operating state in which the transmitter generates a reduced-amplitude electrical output signal at an electrical output and the receiver is to operate in a power-save mode, the communications link including:
        an electro-optical link having an E/O converter for generating an optical signal from an electrical input signal at an electrical input, an optical transmission medium for carrying the optical signal, and an O/E converter for generating an electrical output signal from the optical signal, the electrical output signal provided to the receiver; and
        a circuit coupling the electrical output of the transmitter to the electrical input of the electro-optical link, the circuit being configured to (1) forward the electrical output signal of the transmitter to the electrical input of the electro-optical link during normal-power link operation, and (2) detect initiation of the reduced-power link operating state and, during the reduced-power operating link state, to periodically send Idle messages to the receiver via the electro-optical link to maintain a normal amplitude of the optical signal on the electro-optical link causing the receiver to maintain normal-power operation during the reduced-power link operating state.

9. A computer system according to claim 8, wherein the reduced-power link operating state is accompanied by an entry message and an exit message to be sent from the transmitter to the receiver to cause the receiver to enter and exit a power-save mode respectively, and wherein the circuit detects the entry message from the transmitter, the circuit refraining from sending the entry message to the receiver to prevent the receiver from entering the power-save mode.

10. A computer system according to claim 9, wherein the circuit sends a substantially normal amplitude signal to the receiver after detecting the entry message.

11. A computer system according to claim 10, wherein the substantially normal amplitude signal is a logical idle message.

12. A computer system according to claim 9, wherein the circuit monitors for the exit message from the transmitter and in response to detection of the exit message re-enters a normal operating state in which the circuit passes the output of the transmitter to the input of the electro-optical link and monitors for the entry message from the transmitter.

13. A computer system according to claim 8, wherein the electro-optical link includes a transmit optical subassembly housing the E/O converter, and a receiver optical subassembly housing the O/E converter, the transmit optical subassembly being operative to generate the optical signal on the optical transmission medium having a level corresponding to a level of the electrical input signal, and the receiver optical subassembly including a variable-gain circuit having a gain-adjustment delay capable of causing transitory saturation resulting in the inaccurate reproduction of a transmitted message, the gain-adjustment delay being prevented by the maintaining of the normal amplitude of the optical signal on the electro-optical link during the reduced-power link operating state.

14. A computer system according to claim 8, wherein the electrical output from the transmitter is a differential output having two signal lines driven to different voltage levels for a normal-amplitude electrical output signal and being driven to substantially equal voltage levels for the reduced-amplitude electrical output signal.

15. A communications link for carrying data between a transmitter and a receiver according to a communications protocol specifying a reduced-power link operating state in which the transmitter generates a reduced-amplitude electrical output signal at an electrical output and the receiver is to operate in a power-save mode, the communications link comprising:
an electro-optical link having an E/O converter for generating an optical signal from an electrical input signal at an electrical input, an optical transmission medium for carrying the optical signal, and an O/E converter for generating an electrical output signal from the optical signal, the electrical output signal provided to the receiver; and
a circuit coupling the electrical output of the transmitter to the electrical input of the electro-optical link, the circuit being configured to (1) forward the electrical output signal of the transmitter to the electrical input of the electro-optical link during normal-power link operation, and (2) detect initiation of the reduced-power link operating state and to send messages to the receiver via the electro-optical link to maintain a normal amplitude of the optical signal on the electro-optical link,
wherein the electro-optical link includes a transmit optical subassembly housing the E/O converter, and a receiver optical subassembly housing the O/E converter, the transmit optical subassembly being operative to generate the optical signal on the optical transmission medium having a level corresponding to a level of the electrical input signal, and the receiver optical subassembly including a variable-gain circuit having a gain-adjustment delay capable of causing transitory saturation resulting in the inaccurate reproduction of a transmitted message, the gain-adjustment delay being prevented by the maintaining of the normal amplitude of the optical signal on the electro-optical link during the reduced-power link operating state.

16. A communications link according to claim 15, wherein the reduced-power link operating state is accompanied by an entry message and an exit message to be sent from the transmitter to the receiver to cause the receiver to enter and exit a power-save mode respectively, and wherein the circuit detects the entry message from the transmitter, the circuit refraining from sending the entry message to the receiver to prevent the receiver from entering the power-save mode.

17. A computer system, comprising:
a host controller;
a peripheral device; and
a communications link connecting the host controller as a transmitter to the peripheral device as a receiver, the communications link operating according to a communications protocol specifying a reduced-power link operating state in which the transmitter generates a reduced-amplitude electrical output signal at an electrical output and the receiver is to operate in a power-save mode, the communications link including:
an electro-optical link having an E/O converter for generating an optical signal from an electrical input signal at an electrical input, an optical transmission medium for carrying the optical signal, and an O/E converter for generating an electrical output signal from the optical signal, the electrical output signal provided to the receiver; and
a circuit coupling the electrical output of the transmitter to the electrical input of the electro-optical link, the circuit being configured to (1) forward the electrical output signal of the transmitter to the electrical input of the electro-optical link during normal-power link operation, and (2) detect initiation of the reduced-power link operating state and to send messages to the receiver via the electro-optical link to maintain a normal amplitude of the optical signal on the electro-optical link,
wherein the electro-optical link includes a transmit optical subassembly housing the E/O converter, and a receiver optical subassembly housing the O/E converter, the transmit optical subassembly being operative to generate the optical signal on the optical transmission medium having a level corresponding to a level of the electrical input signal, and the receiver optical subassembly including a variable-gain circuit having a gain-adjustment delay capable of causing transitory saturation resulting in the inaccurate reproduction of a transmitted message, the gain-adjustment delay being prevented by the maintaining of the normal amplitude of the optical signal on the electro-optical link during the reduced-power link operating state.

18. A computer system according to claim 17, wherein the reduced-power link operating state is accompanied by an entry message and an exit message to be sent from the transmitter to the receiver to cause the receiver to enter and exit a power-save mode respectively, and wherein the circuit detects the entry message from the transmitter, the circuit refraining from sending the entry message to the receiver to prevent the receiver from entering the power-save mode.

* * * * *